June 30, 1964   B. MELLON   3,139,319
DATA HANDLING
Filed Feb. 3, 1961   3 Sheets-Sheet 2
FIG_3
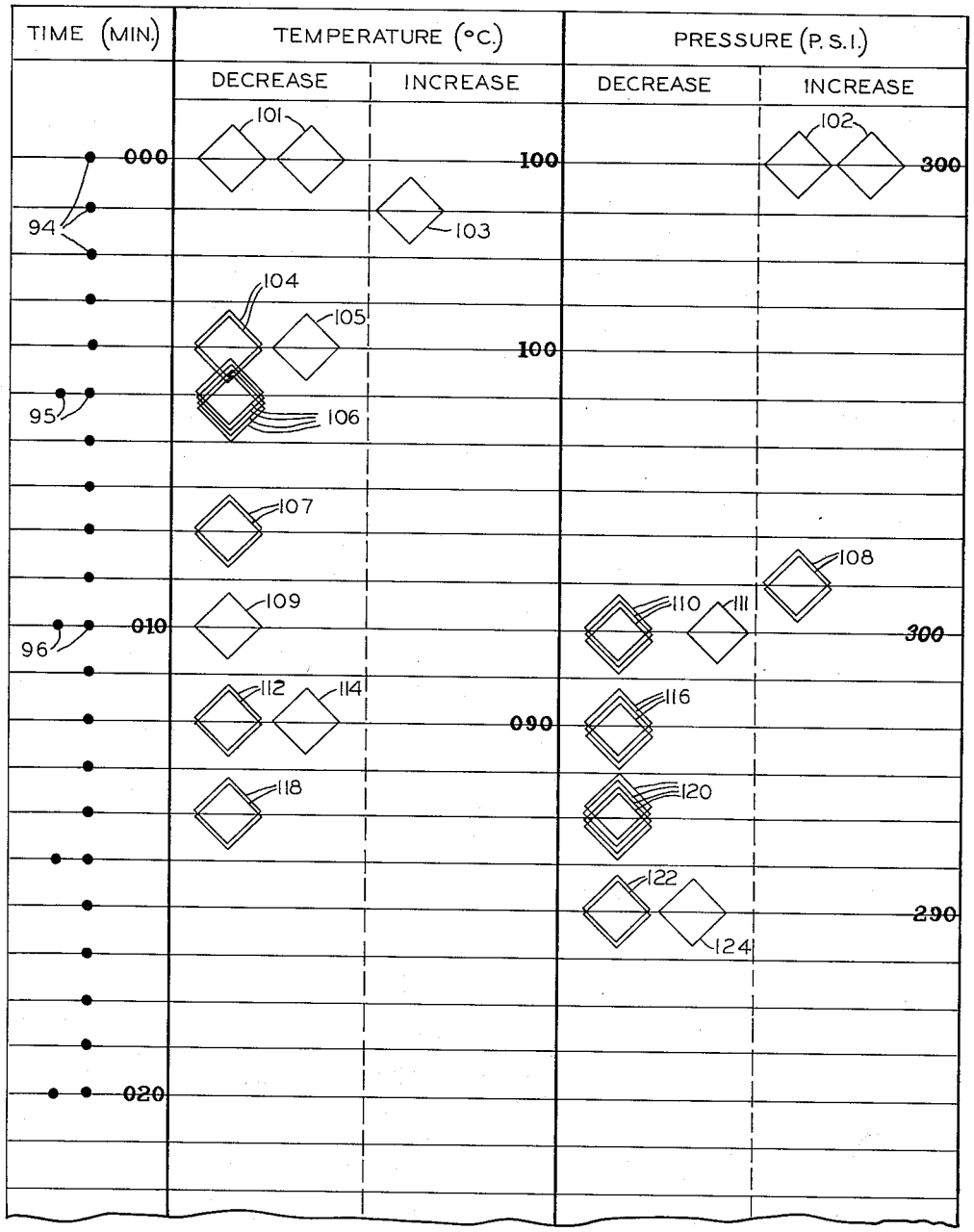
INVENTOR.
BOB MELLON
BY Christie, Parker & Hale
ATTORNEYS

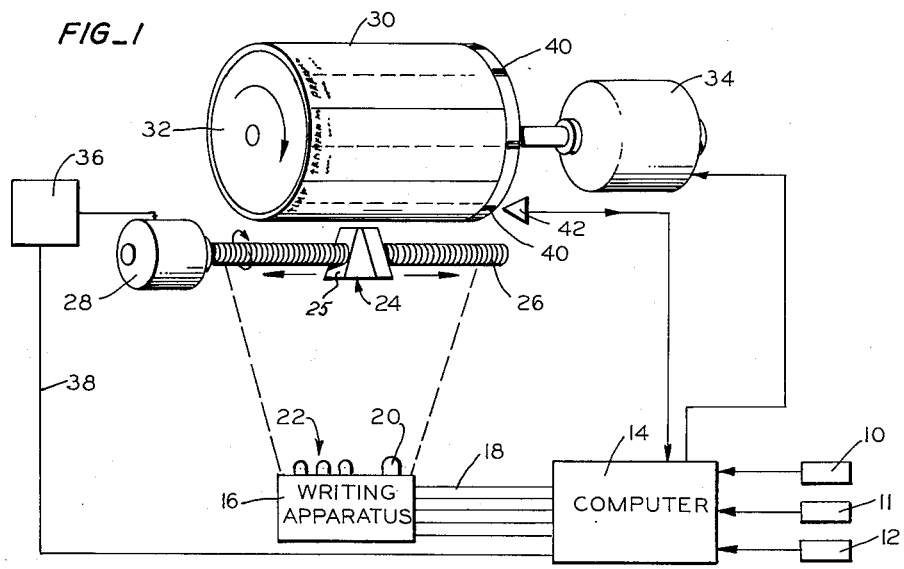
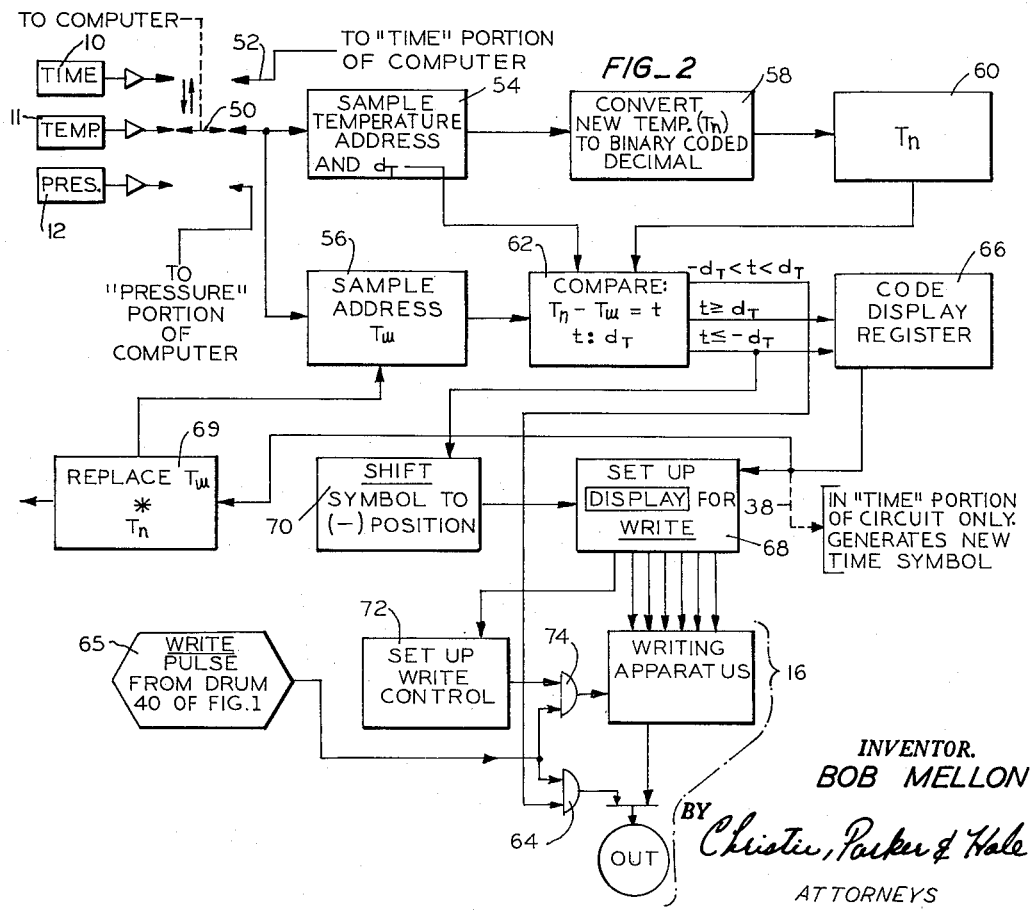

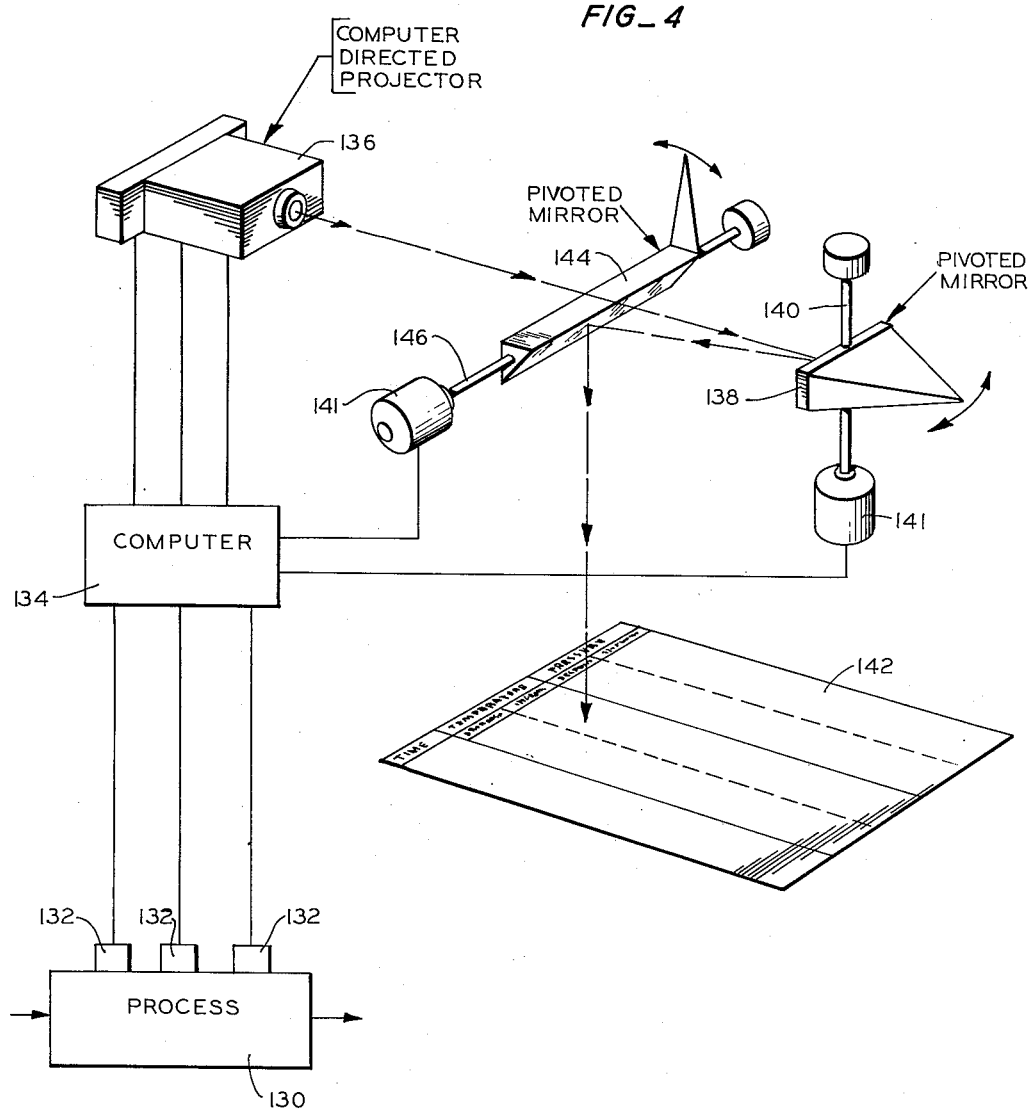

United States Patent Office 3,139,319
Patented June 30, 1964

3,139,319
DATA HANDLING
Bob Mellon, 849 Newell Place, Palo Alto, Calif.
Filed Feb. 3, 1961, Ser. No. 87,006
5 Claims. (Cl. 346—34)

This invention relates to methods and apparatus for handling data taken from systems having a plurality of variables.

It is now common practice to use automatic controls for operations such as chemical processing, pipe line transmission of fluids, machining, statistical analysis, and the like.

As automatic control systems are more widely used and for increasingly complex operations, the problem of interpreting and monitoring the total process and control system by human operators becomes more difficult. Conventional techniques and analytical devices available to trained and experienced technical personnel are often inadequate for governing a complex operation, even though it may be fully automatic. Practical considerations demand that operating personnel be able to take rapid corrective actions without full technical analysis of data from the process, because operating difficulties may well be in the interpretive portion of the automatic control system.

With suitably presented information, an individual can still interpret complex situations, and take suitable corrective actions with good judgment that far exceeds the capabilities of any presently available automatic control system.

This invention is ideally suited for the taking and presentation of information for monitoring a complex process by operating personnel.

The display system also has general utility for any multi-variate representation for which correlation of changes in the magnitudes are of interest.

Even purely mathematical problems may be sometimes alleviated by graphic displays. For example, plotting various derivatives of a function may educate or disclose the realm of significance. More importantly, perhaps, the multi-variable display will provide convenient or effective comparisons of consequences of changing assumptions in mathematical systems, models, etc. It will aid, for example, the search for simpler and/or critical methods and parameters for approximations. For these latter purposes, there are no sensors, analog converters, etc., for all data is generated by computing.

The invention provides a data logging system that maximizes the utility of human capabilities for recognizing significant combinations of information in its total context, and thus facilitates reaching correct decisions quickly even though interpretation by rigorous mathematical techniques is not reliable or economically justified.

It has been common practice to use tabulated data and graphic displays in innumerable variety in attempting to present a "snapshot" that contains dynamic information. These prior techniques have been somewhat successful and have permitted progress in monitoring and controlling dynamic systems. Information in this prior form provides a relatively simple technique for taking and recording data to increase the effectiveness of operating personnel in managing complex systems. However, in many operations the particular sequence of changes in magnitudes of the variables is not so significant as how the rates of changes are related to other sequences of rates of changes of other variables. This is true for many non-static systems, such as physical devices, chemical processes, and social organizations.

This invention provides for improved taking and recording of data in a static form that provides at a glance to a skilled operator the dynamics of the operation under observation.

In terms of method for handling data taken from a system having several variables, the invention contemplates sampling or sensing one of the variables to serve as a reference dimension or synchronizing parameter for the display of other variables. For example, the synchronizing variable might be "time" so that the display of the values of all the other variables are synchronized at common time intervals. The synchronizing variable need not necessarily be changing uniformly, as is the case with "time", but might be some parameter which changes its value irregularly. For example, in analyzing the performance of the stock market, the synchronizing variable might be the total dollars invested, and the other variables sampled and recorded with reference to that variable. Ordinarily, the synchronizing variable should change in only one direction during the period of the analysis.

Once the synchronizing variable is selected, the other variables in the system are each sampled a plurality of times between each sampling of the synchronizing variable. Preferably, the synchronizing variable is sampled and recorded at uniform increments. For example, if the synchronizing variable is "time" it is recorded at regular periodic intervals, say each minute. On the other hand, if the synchronizing variable is one which changes irregularly with time, such as the dollars invested in the stock market on a given day, the value of the invested dollars would be sampled and recorded at regular intervals of invested money, say every $100,000. The other variables in the operation are sampled or sensed a plurality of times between the sampling of the synchronizing variable, and each time each of the other variables differs from its previously recorded value by a predetermined increment, the new value of each of the other variables is recorded in a position which permits its ready identification and discernment from the other variables.

Thus, the rate of change of each value determines the "frequency" or "density" at which it is recorded relative to the synchronizing variable. This is equivalent to presenting the first derivative of each variable, and with respect to any other variable or its derivative. The entire display therefore is a simultaneous presentation of a dynamic history of the recorded qualities of the operation.

Ordinarily, the variables change sufficiently rapidly to make undesirable the printing of numbers each time a variable changes by its preset increment. Therefore, in the preferred method, suitable symbols are used to indicate the change of a variable by its preset increment, and actual numbers are recorded only as often as necessary to facilitate interpretation of the logged data. Thus, the position and density of the symbols for each variable provide immediate recognition of approximate values and rates of changes of the variables relative to the synchronizing variable, and relative to the magnitudes and rates of changes of the other variables. By suitable choice of the symbols, data from any system of variables is presented in a readily interpretable digital form.

In the preferred method, the symbols for the values of the variables are recorded in such a way that it is readily apparent whether the values are increasing, decreasing, or static. In one form of the invention, values for each variable are recorded in respective columns. Each column is divided into two sub-columns, say one sub-column on the right and the other sub-column on the left. As a variable increases by its preset increment, its corresponding symbol is recorded in one of the sub-columns, and as the variable decreases by its preset increment, the proper symbol is recorded in the other sub-column to show that it has changed in the opposite direction.

In terms of apparatus for monitoring and recording data taken from a system having a plurality of variables, the invention includes means for sensing the value of one of the variables periodically, and also includes means for sensing the values of each of the other variables a plurality of times for each sensing of the value of the said one variable.

In the preferred apparatus of the invention, means are included for recording the values of the variables, and preferably means are also provided for recording each of the variables only after each of them has changed a fixed preset increment. Preferably, the values for each variable are recorded in one respective area when each variable increases, and are recorded in a separate area when each variable decreases.

These and other aspects of the invention will be more fully understood from the following detailed description and the accompanying drawings in which:

FIG. 1 is a schematic drawing showing one form of apparatus for practicing this invention;

FIG. 2 is a block diagram of a portion of a computer program for actuating the apparatus shown in FIG. 1;

FIG. 3 is a representative plot of data obtained with the apparatus shown in FIG. 1; and FIG. 4 is a schematic drawing of an alternate embodiment of apparatus for logging data in accordance with this invention.

Referring to FIG. 1, a series of transducers 10, 11, and 12 are arranged to pick up data from a process to be monitored and controlled, say a pilot plant (not shown) for a chemical process. The transducers may be thermocouples, strain gages, bellows-operated potentiometers, or any other devices providing electrical outputs which are functions of the values of the variable of interest in the pilot plant.

To simplify the explanation of the invention, only three transducers are shown and discussed. Transducer 10 is driven by a clock mechanism (not shown) to deliver an electrical signal proportional to the passage of time. Transducer 11 senses temperature, and transducer 12 senses pressure. Of course, for a typical pilot plant many additional transducers may be used to sense additional values such as differential pressure, flow rate, mass, chemical composition, viscosity, specific gravity, etc.

The raw data output from each transducer is fed into a computer 14, which may be a conventional general purpose digital type. The computer is programmed in a conventional way to convert the raw data to values desired. For example, differential pressure, specific gravity, and viscosity may be treated to give flow rate which is subsequently converted to a digital output from the computer.

A conventional binary/decimal writing apparatus 16 receives the computer outputs through leads 18. The writing apparatus is conventional, and includes a "Nixie" tube 20, sold by the Burroughs Corporation, to flash images of numbers in response to signals from the digital computer. The writing apparatus also includes other light tubes 22 conventionally masked to flash suitable symbols corresponding to the values of the variables processed by the computer. Light from the writing apparatus passes through a lens 24 mounted on a block 25 on a threaded rod 26, which is turned intermittently by a lens stepping motor 28. The lens focuses the light on a photographic film 30 mounted around a cylindrical drum 32 rotated by a drum motor 34 about an axis parallel to the threaded rod 26. The writing apparatus, lens, film, and drum are inclosed in a suitable light-tight box (not shown). The box may be omitted, if a suitable light source, such as ultra-violet, is used with film that is insensitive to ordinary light. The lens stepping motor 28 is turned intermittently by power supplied through a multi-vibrator 36, which is actuated through lead 38 by a signal delivered from the computer as described in detail below.

Assuming that the synchronizing variable is time, the drum motor is driven at a speed to rotate the drum at the rate required for sensing and recording the variables at the desired intervals. For example, if time is to be recorded each minute, and temperature and pressure are to be sensed and possibly recorded 30 times per minute, i.e., once every two seconds, the drum is rotated at the rate of 30 r.p.m. The periphery at the right (as viewed in FIG. 1) end of the drum includes a plurality of indexing marks 40, say magnetic signals. A magnetic pickup head 42 is disposed adjacent the drum periphery containing the indexing marks, and delivers a signal to the computer to trigger the flashing of the proper lights in the writing apparatus. For example, with the drum in the position shown in FIG. 1, a signal is generated which commands the computer and writing apparatus to flash the image of a time signal to the film on the drum. As the drum continues to rotate in the direction indicated by the arrow at the left end of the drum, the next indexing mark commands that the temperature be recorded, provided it has changed sufficiently from the previously recorded value. The same is true for pressure as the drum rotates. The photographic speed is sufficiently fast that there is no blurring of the images. Of course, the drum can be slowed or even stopped for recording each value, if slow speed film is used.

The computer is programmed so that the values for temperature and pressure are sampled a plurality of times for each recording of a unit of time. For example, if time is to be recorded each minute, and temperature and pressure are to be sampled each two seconds, the drum is rotated at the rate of 30 r.p.m. After a time a mark is recorded, the timing mark is not printed again until the time index marker on the drum has passed the magnetic head 42 thirty times. The lens stepping motor is then actuated to turn the rod 26 and move the lens 24 to the new position for the subsequent recording of the next time signal. The lens is then held stationary as the drum rotates thirty more times. Each time the temperature indexing mark passes the magnetic pickup head 40, the computer is directed to record the most recent temperature, provided it has changed a minimum amount from the previously recorded value. For the purpose of explanation, it is assumed that the computer is set to record the temperature only when it changes at least one degree from the previously recorded value. The same system is used in recording the values of pressure, when pressure changes by as much as 1 p.s.i. from the previously recorded value of pressure.

The operation of the apparatus shown in FIG. 1 is best understood by referring to FIG. 2, which shows in block diagram a portion of the computer programming circuit. The outputs of transducers 10, 11, and 12 are intermittently sampled by a switch 50, which is moved by a stepping relay (not shown) in accordance with instructions from the computer. Assuming that time is to be recorded once a minute, and the values of temperature and pressure are to be sampled once every two seconds, as mentioned above, the switch 50 is moved to connect the output of time transducer 10 to its respective portion of the computer circuit through a lead 52, which results in the proper time symbol being flashed onto the film 30 shown in FIG. 1.

The switch 50 then moves down to connect the output of the temperature transducer 11 to the temperature portion of the computer circuit. The computer is then directed to the temperature address in block 54 which has stored in it the binary coded decimal equivalent of a preset increment of temperature $d_T$, which represents a temperature increment of 1°. The switch 50 also directs the computer to sample address $T_w$ in block 56, which has stored in it the binary coded decimal equivalent of the previously written value of temperature. The analogue signal from the temperature transducer is converted in block 58 to an equivalent binary coded decimal value of the new temperature $T_n$, which is set up in block 60 and fed to a comparison block 62 that also receives the binary coded decimal equivalent of the previously written value of temperature from block 56. In the comparison block 62, the previously written temperature $T_w$ is subtracted from the current temperature $T_n$ to give a temperature difference $t$ whose sign depends upon the relative values of the two values $T_n$ and $T_w$. The temperature difference $t$ is compared with the standard fixed increment $d_T$ to determine whether or not the new or current temperature $T_n$ will be recorded, and where it will be recorded to indicate if it is increasing or decreasing. For example, if the temperature differential $t$ is greater than $-d_T$ and less than $+d_T$, a signal is sent to a first "and" gate 64, which also receives a writing pulse from block 65 in response to the temperature indexing mark on the drum passing the writing head 42 (see FIG. 1). Under these conditions, the writing apparatus is by-passed, and no symbol is recorded for this particular sampling of the temperature.

On the other hand, if the differential temperature $t$ is greater than or equal to the fixed increment $d_T$, a pulse is sent to a code display register in block 66, which sets up the computer circuit to print a symbol for the new temperature $T^*_n$ to be written. A pulse from the code display register block 66 is sent to block 68 to set up the proper flip-flops in the writing apparatus to print the appropriate symbol for the newly written temperature in position on the film to indicate the temperature has increased. A signal is also sent from block 66 to replacement block 69 in which a binary coded decimal equivalent $T^*_n$ is set up for the newly written temperature value to replace the previously written value $T_w$ in address block 56.

If the temperature differential $t$ is less than or equal to $-d_T$, a pulse is sent to block 69 which sets up the shift circuit in block 70 to move the symbol to the negative recording position to indicate a decrease in temperature, as described in more detail below with respect to FIG. 3. A pulse from the negative shift block 70 is fed to the block 68 so the flip-flops (not shown) in the computer are set up to write the new temperature $T^*_n$ in the negative position to indicate that the temperature is decreasing instead of increasing.

Appropriate signals from the block 68 are transmitted to the writing apparatus 16 and to a write control set-up block 72 which provides write control pulse for a second "and" gate 74 to trigger the writing apparatus when a write pulse is received from the block 65.

The procedure for pressure sensing and recording is identical with the above procedure for sensing and recording temperature, or any other parameter, and is not shown or described in detail for brevity.

After the switch 50 has been exercised through the required number of sampling positions at the outputs for the temperature and pressure transducers, it is moved back to the output of the time transducer, which supplies a signal that is treated in the same way as described above for the temperature measurement and recording. If sufficient time has lapsed, a pulse is transmitted by line 38 (FIG. 1) to the multi-vibrator 36 which actuates the lens stepping motor to move the lens to the new position for recording the new time symbol and align the lens for the new sequence of sampling and recording temperature and pressure at the new time. Lead 38 is shown only in phantom line in FIG. 2, because this portion of the circuit is used for handling temperature data. The lead actually is in the time portion of the circuit only, which is not shown for simplicity.

A portion of a typical data log obtained in accordance with the apparatus and method of this invention is shown in FIG. 3 on a data sheet developed from the film 30 on the drum 32 shown in FIG. 1. The data shown in FIG. 3 are recorded in three vertical columns for "Time," "Temperature," and "Pressure." For simplicity, the recorded data is limited to these three variables, although many additional variables may also be included. The temperature and pressure columns are each divided into two sub-columns. The sub-column on the left in each case is used when the variable decreases in value, and the sub-column on the right is used to record values when the variables are increasing.

Referring to the column for "Time," a small dot 94 is recorded for each interval of time of interest, say 1 dot for each minute. At the end of 5 minutes, 2 horizontal aligned dots 95 are recorded by the writing apparatus, and at the end of 10 minutes, 2 horizontally aligned dots 96 are recorded and the number 010 is also printed to facilitate reading the time scale. For the purpose of illustration, it is assumed that the system is monitoring an operation which at time "Zero" has a temperature of 100° C. and a pressure of 300 p.s.i. At time "Zero," the lens 24 is positioned so that a spot of light is focused in the "Time" column, and the number 000 is also focused in the time column adjacent the first dot. As the drum rotates, two horizontally aligned diamond symbols 101 are printed in the temperature column at the top of the left ("decrease") sub-column (assuming that the previously recorded temperature was greater than 100° C.). At the extreme right side of the right ("increase") sub-column the number 100 is also printed by the writing apparatus to identify quantitively the two diamond symbols in the temperature decrease column.

As the drum rotates to bring the pressure column at the focal point of the lens, the number 300 and two diamond symbols 102 are printed in the pressure right ("increase") sub-column in alignment with the mark for zero time and the two symbols 101 in the temperature column (assuming that the pressure has increased from a lower value to 300 p.s.i.).

Between time "Zero" and 1 minute, which is represented by the second dot from the top in the "Time" column, the switch 50 (FIG. 2) is cycled thirty times between the outputs of the temperature and pressure transducers. During this interval, it is assumed that the temperature has not changed more than 1° C., and that the pressure has not changed more than 1 p.s.i. Consequently, no additional symbols are printed on the horizontal line of the data sheet passing through the point "Time Zero" and the symbols 101 in the temperature column and the symbols 102 in the pressure column. However, between one and two minutes after the start of the run, the temperature increases 1° C., and therefore a unit diamond symbol 103 is printed in the temperature increase sub-column to indicate that the temperature has risen to 101° C. The pressure has not changed by as much as 1 p.s.i., therefore no symbols are printed in either of the pressure sub-columns. For the next three minutes, no additional changes in temperature or pressure take place in the amount exceeding their respective comparison increments. However, between 4 and 5 minutes, the temperature decreases 2 degrees from the previous recorded value 101° to 99°, so two overlapping diamond symbols 104 are printed almost on top of each other at the horizontal line corresponding to 4 minutes. For the purpose of illustration, these two diamonds have been drawn spaced slightly apart, although in actual recording they will be almost superimposed. A second diamond 105 is printed laterally spaced from the symbols 104 to indicate the temperature has passed through the 100° value. No significant change has taken place in pressure between 4 and 5 minutes, so no pressure symbols are recorded.

During the time interval between 5 and 6 minutes, the temperature drops another 4° to 95°, as indicated by the 4 unit diamond symbols 106 in the temperature decrease column. Again, these symbols are shown slightly spaced apart, although in actual practice they will be virtually superimposed, except for the slight play in the apparatus, which is desirable to permit the different symbols to be distinguished when they are printed in high density form.

No additional changes in either temperature or pressure occur until the period between 8 and 9 minutes when the temperature drops another 2° C. to 93°, as indicated by the two unit diamond symbols 107 in the temperature decrease column. The pressure is still 300 p.s.i. However, between 9 and 10 minutes, the pressure increases 2 p.s.i. to 302 p.s.i., as indicated by the two diamond symbols 108. Between 10 and 11 minutes, the temperature decreases another degree to 92° C. (unit symbol 109) and the pressure drops three pounds to 299 p.s.i. as indicated by the three diamond symbols 110 in the pressure decrease column. A decade diamond symbol 111 and the number 300 are printed to show that the pressure has passed through 300 p.s.i.

Between 12 and 13 minutes, the temperature decreases two more degrees to 90° C., as indicated by the two unit diamond symbols 112, the decade diamond symbol 114, and the printed number 090. During the same interval, the pressure decreases three pounds to 296 p.s.i. as indicated by the three unit diamond symbols 116.

The next change occurs between 14 and 15 minutes when the temperature drops 2 more degrees to 88° as indicated by the two unit diamond symbols 118. During the same interval, the pressure drops four pounds to 292 p.s.i. as indicated by the four unit diamond symbols 120. The only additional recorded change for the time interval shown occurs between 16 and 17 minutes in which the pressure drops two pounds to 290 p.s.i. as indicated by the two unit diamond symbols 122, the decade diamond symbol 124, and the printed number 290.

The data log shown in FIG. 3 presents temperature and pressure data synchronized with time so that the density of data symbols indicates at a glance the rate at which each of the variables is changing. The position of the symbols indicates both the absolute value of the variables and when the changes in each variable took place with respect to the other variables. In this form, the data is presented visually in a manner which promotes and facilitates human ability to select quickly important combinations of relevant information and make proper decisions more rapidly than previously possible by scanning data in conventional tabulated or graph form. In effect, this invention presents data in a form equivalent to the derivative or rate of change of any variable of any order and with respect to any other variable of its derivative.

In an alternate arrangement, the lens stepping motor is moved in small increments between each minute that is recorded so that the data symbols for pressure and temperature are not printed on top of each other, but are slightly spaced vertically as shown in FIG. 3. For example, each time the drum revolves, the lens is stepped 1/30 of the distance between two minute symbols. This change can be either incremental or continuous.

In another form, the time symbols are printed in each of the columns for the other variable, such as temperature and pressure to facilitate reading of the time scale.

The apparatus shown in FIG. 1 can be modified in many different ways without departing from the spirit or scope of this invention. For example, a plurality of lenses can be used so that each lens is aligned with a respective column located on a long strip of film which is moved almost endlessly past the lenses. In this form, the data is presented as an endless strip. Another modification is to shift longitudinally the position of the drum or the film shown in FIG. 1 instead of moving the lens.

Another refinement for presenting the data is to omit the printing of the numbers when the rate of change is so high that the numbers tend to overlap. In other words, the high density of unit and decade symbols would be maintained, but the printing of numbers would be skipped as required to avoid their overlapping.

FIG. 4 shows an alternate system for recording data in accordance with this invention. A process stream 130 is monitored by transducers 132 to sense the values of different variables such as temperature, pressure, pressure differential, flow rate, stream composition, etc. A computer 134 receives the raw data from the transducers and converts them into the desired values or ratios, and operates a light projector 136 which directs a beam of light onto a first mirror 138 mounted to pivot about a shaft 140 vertical to the plane of a sheet of data paper film 142. Light is reflected from the first mirror to a second mirror 144 mounted to rotate about a second shaft 146 perpendicular to the first shaft 140. Each of the mirror shafts are turned by computer-directed motors 141 to rotate to the proper positions to locate the spot of light from the projector at the proper point on the data paper for recording the values of the different variables. The logic and operation of the computer is substantially identical with that described in the system shown in FIG. 2, and is not repeated in detail for the sake of brevity. Briefly, however, the first mirror 138 is pivoted to locate the image or images from the projector in the proper variable column, and the second mirror is tilted to position the light image from the projector at the proper position in each respective column so that a data log is obtained identical with that shown in FIG. 3.

Although the invention has been described specifically with reference to a process, it will be apparent that data may be treated in accordance with this invention from many different types of systems which do not necessarily involve process control. A partial list of examples is as follows:

(1) Space technology
(2) Medical sciences (biology, etc.)
(3) Business administration
(4) Industrial administration
(5) Finance
(6) Structure design and testing
(7) Meteorology
(8) Mathematics (all branches)
(9) Governmental planning, control and monitoring
(10) Flight and other navigational monitoring and interpretation of logged data
(11) Traffic planning and control
(12) Interpretation of raw data gathered at very high speed (or very low speed) in studies, e.g., of explosion experiments, impulse motors, ignition, combustion, etc.

I claim:
1. Apparatus for monitoring and photographically recording data taken from a system having a plurality of monitoring variables, the apparatus comprising a data sheet having a photosensitive surface, means for sensing and photographically recording on the data sheet the value of one of the variables periodically, means for sensing the values of each of the other variables a plurality of times between sensing of the said one variable, and means for photographically recording on the data sheet the values of each of the said other variables at respective frequencies proportional to the rates at which each of the said other variables is changing.

2. Apparatus for monitoring and photographically recording data taken from a system having a plurality of monitoring variables, the apparatus comprising a data sheet having a photosensitive surface, means for sensing and photographically recording on the data sheet the value of one of the variables periodically, means for sensing and photographically recording the values of each of the other variables in plurality of times between sensing of the said one variable, means for determining the difference between the value of each of the said other variables when sensed and the previously photographically recorded value for the same variable, means for comparing each difference between values for each of the said other variables with a separate respective increment for each of the said other variables, and means for photographically recording on the data sheet the most recent value of each of the said other variables when the difference exceeds its respective increment.

3. Apparatus according to claim 2 which includes means for photographically recording on the data sheet each new value of the said other variables in one area when the variables are increasing in value, and photographically recording on the data sheet each new value of the said other variables in a different area when the variables are decreasing in value.

4. Apparatus for monitoring and photographically recording data taken from a system having a plurality of monitoring variables, the apparatus comprising a data sheet having a photosensitive surface, means for sensing and photographically recording on the data sheet the value of one of the variables periodically, means for sensing the values of each of the other variables a plurality of times between sampling of the said one variable, and means for photographically recording on the data sheet the values of each of the said other variables at separate respective frequencies proportional to the rates at which the variables are changing.

5. Apparatus for photographically recording data taken from a system having a plurality of variables, the apparatus comprising a photosensitive material having a recording surface, a character generator, a focusing system disposed to form images of characters formed by the generator on the recording surface, means for shifting the position focusing system relative to the recording surface to record images in different positions on the photosensitive material, means for developing electrical signals proportional to the value of a first variable, means for applying the first signal to the generator to produce a character which is focused and recorded on the photosensitive material, means for developing an electrical signal proportional to at least one of the other variables a plurality of times for each first signal, means for applying the plurality of signals to the generator to produce characters which are focused and recorded on the photosensitive material, and means for moving the focusing system relative to the recording surface in response to electrical signals applied to the generator.

References Cited in the file of this patent
UNITED STATES PATENTS

| 2,883,255 | Anderson | Apr. 21, 1959 |
| 2,965,431 | Milmore | Dec. 20, 1960 |

FOREIGN PATENTS

| 525,074 | Belgium | Dec. 31, 1953 |